No. 896,446.
PATENTED AUG. 18, 1908.
W. GORDON.
HORSE BLANKET.
APPLICATION FILED AUG. 27, 1907.
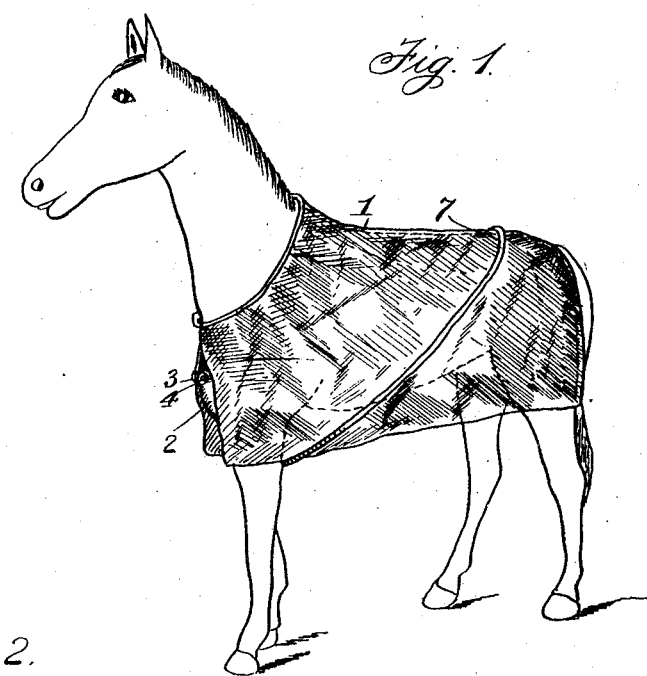
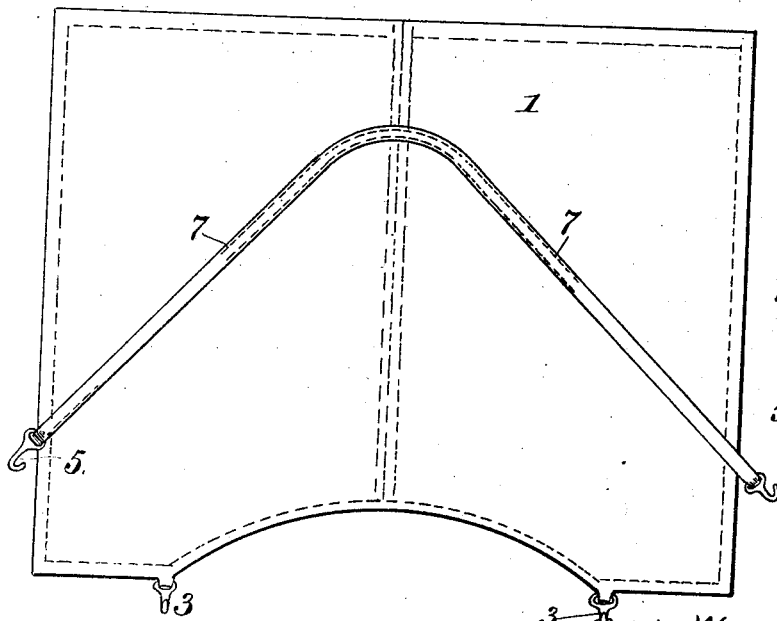
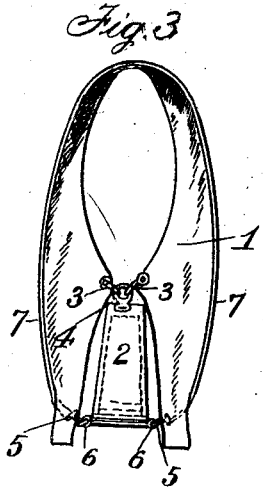
Inventor.
WINNE GORDON.

UNITED STATES PATENT OFFICE.

WINNE GORDON, OF SHARON SPRINGS, NEW YORK, ASSIGNOR OF ONE-HALF TO ALONZO B. COONS, OF SHARON SPRINGS, NEW YORK.

HORSE-BLANKET.

No. 896,446.  Specification of Letters Patent.  Patented Aug. 18, 1908.

Application filed August 27, 1907. Serial No. 390,273.

*To all whom it may concern:*

Be it known that I, WINNE GORDON, a citizen of the United States, residing at Sharon Springs, in the county of Schoharie and State of New York, have invented certain new and useful Improvements in Horse-Blankets, of which the following is a specification.

My invention relates to improvements in horse blankets. Its objects are to provide for effectively retaining the blanket in proper position upon the horse or animal, as against its working away therefrom or otherwise becoming accidentally displaced by the motion of the horse or animal or other cause, and to carry out these objects in a simple, economic and effective manner.

It consists of certain instrumentalities or features substantially as hereinafter fully disclosed and pointed out by the claims.

In the accompanying drawing illustrating the preferred embodiment of my invention—Figure 1 is a view thereof as in actual use upon an animal. Fig. 2 is a plan view of the blanket. Fig. 3 is a front view of the same.

In the disclosure of my invention, I make the blanket 1 of any desired material and suitably conform it to the general outline indicated. A separate piece or member 2, which may be termed a web, preferably of the general form disclosed, is adapted to be connected, as by hooks-and-eyes 3, 4, or otherwise, to the blanket, just under the throat of the horse or animal, preferably a single eye being applied about centrally to the upper end of said member or web, and two hooks to said blanket at opposite points of its forward edges, thus providing for effecting the retention of the blanket evenly upon the horse at the forward end, which, it is obvious, will effectively prevent the shifting or skewing of the blanket at that point. Said web or member 2 has connected to it, at its lower corner-edges, as also by hooks-and-eyes 5, 6, or otherwise, the ends of a strap 7 extending diagonally upwardly and rearwardly along the outer surface of the blanket, with its thus looped central portion carried back to near the extreme rear end of the blanket or the crupper, said strap being suitably secured by sewing or otherwise at this point, as well as for the greater portion of its length to said blanket. Also it will be noted that the lower end of the member or web 2 is arranged to extend back in between the front legs of the horse, and that the connection between said member or web and said strap is effected in rear of said front legs, whereby the pull from said member or web is evenly distributed laterally upon the blanket throughout its length and centrally thereof, as is apparent, thus serving to retain the blanket from its secured forward end bodily in position upon the horse as against any possible shifting thereof by the motion of the horse or other source. Also this arrangement and connecting together of the parts does not subject the animal or horse to any inconvenience or discomfort as would arise if otherwise arranged, as for instance if the strap and web-member were connected together in front of, and said strap drawn across the legs of the horse, which is avoided herein.

I claim—

1. The combination with a blanket, fastening means at its forward edge and provided with a strap extending diagonally from a point at or near the rear end of the center of the blanket to the lower edges of the latter at a point at or near the forward end, said strap having fastenings at its ends, and a web having several fastening devices thereon adapted to be engaged by the fastenings on the forward edge of the blanket and at the ends of the strap whereby to fasten the blanket securely about the neck, breast, and around the forward legs of the animal wearing it.

2. A horse blanket, a web-member and a strap, said blanket being equipped at opposite points, at its forward end with hooks engaging an eye centrally arranged at the upper end of said web-member and said strap being secured to said blanket back to near its rear end or the crupper and having its ends provided with hooks engaging eyes secured to said web at its lower corner-edges.

In testimony whereof I affix my signature, in presence of two witnesses.

WINNE GORDON.

Witnesses:
 FRANK H. MORRELL,
 A. J. SMITH.